US011386609B2

(12) United States Patent
Serry et al.

(10) Patent No.: US 11,386,609 B2
(45) Date of Patent: Jul. 12, 2022

(54) HEAD POSITION EXTRAPOLATION BASED ON A 3D MODEL AND IMAGE DATA

(71) Applicant: MICROSOFT TECHNOLOGY LICENSING, LLC, Redmond, WA (US)

(72) Inventors: Mattan Serry, Herzliya (IL); Zvi Figov, Modiin (IL); Irit Ofer, Kfar Saba (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/138,207

(22) Filed: Dec. 30, 2020

(65) Prior Publication Data
US 2022/0130104 A1 Apr. 28, 2022

Related U.S. Application Data

(60) Provisional application No. 63/106,337, filed on Oct. 27, 2020.

(51) Int. Cl.
*G06T 15/20* (2011.01)
*G06T 19/20* (2011.01)
(Continued)

(52) U.S. Cl.
CPC .......... *G06T 15/20* (2013.01); *G06T 3/20* (2013.01); *G06T 3/40* (2013.01); *G06T 7/60* (2013.01);
(Continued)

(58) Field of Classification Search
CPC .... G06T 7/60; G06T 2210/12; G06K 9/00228
See application file for complete search history.

(56) References Cited

U.S. PATENT DOCUMENTS 8,326,029 B1 * 12/2012 Obrador .............. G06F 16/5838
382/164
2012/0069007 A1 3/2012 Pegg et al.
(Continued)

FOREIGN PATENT DOCUMENTS

GB   2543893 A    5/2017
WO   2012126135 A1  9/2012

OTHER PUBLICATIONS

Akakin, et al., "2D/3D Facial Feature Extraction", In Proceedings of Image Processing: Algorithms and Systems, Neural Networks, and Machine Learning, vol. 6064, Mar. 15, 2006, 12 Pages.
(Continued)

*Primary Examiner* — Phi Hoang
(74) *Attorney, Agent, or Firm* — Scott Y. Shigeta; Newport IP, LLC

(57) ABSTRACT

An approach using 3D algorithms to solve 2D head localization problems is disclosed. A system can extrapolate aspects of one part of an object, e.g., extract characteristics of a person's head, using a 2D input image of another part of the object, e.g., a 2D image of the person's face. The system then selects an appropriate 3D model by the use of facial features detected in an image of a person's face. Using the selected 3D model and the 3D rotation angles provided by a face detector, the system rotates the model and then projects the model to a 2D shape. The system then scales and translates, e.g., transforms, the 2D shape to match the 2D face bounding box. Then, using the transformed 2D shape, the system extracts a bounding box for the extracted portion of an object, e.g., the head of the person depicted in the 2D input image.

20 Claims, 9 Drawing Sheets

Region 501 = Predicted face area from neural network

Region 502 = Predicted face area from 3D model

Region 503 = Annotated head area

Region 504 = Predicted head area from 3D model

(51) Int. Cl.
  *G06T 7/60* (2017.01)
  *G06T 3/20* (2006.01)
  *G06T 3/40* (2006.01)
  *G06V 40/16* (2022.01)

(52) U.S. Cl.
  CPC ............ *G06T 19/20* (2013.01); *G06V 40/161* (2022.01); *G06T 2207/30201* (2013.01); *G06T 2210/12* (2013.01); *G06T 2219/2016* (2013.01)

(56) References Cited

U.S. PATENT DOCUMENTS

| | | | |
|---|---|---|---|
| 2012/0198337 A1* | 8/2012 | Flint | G11B 27/34 715/723 |
| 2014/0169659 A1 | 6/2014 | Lauer | |
| 2015/0178554 A1 | 6/2015 | Kanaujia et al. | |
| 2017/0316576 A1 | 11/2017 | Colbert et al. | |
| 2018/0336737 A1* | 11/2018 | Varady | G06T 7/62 |
| 2019/0279393 A1 | 9/2019 | Ciuc et al. | |
| 2020/0272806 A1 | 8/2020 | Walker et al. | |
| 2020/0285834 A1 | 9/2020 | Ishii | |
| 2021/0056293 A1* | 2/2021 | Yin | G06K 9/00288 |
| 2021/0209839 A1* | 7/2021 | Hu | G06T 3/0093 |

OTHER PUBLICATIONS

Kong, et al., "Head Pose Estimation From a 2D Face Image Using 3D Face Morphing With Depth Parameters", In Journal of IEEE Transactions on Image Processing, vol. 24, Issue 6, Jun. 2015, pp. 1801-1808.

Vatahska, et al., "Feature-based Head Pose Estimation from Images", In Proceedings of 7th IEEE-RAS International Conference on Humanoid Robots, Nov. 29, 2007, pp. 330-335.

"International Search Report and Written Opinion Issued in PCT Application No. PCT/US2021/048110", dated Dec. 6, 2021, 10 Pages.

* cited by examiner

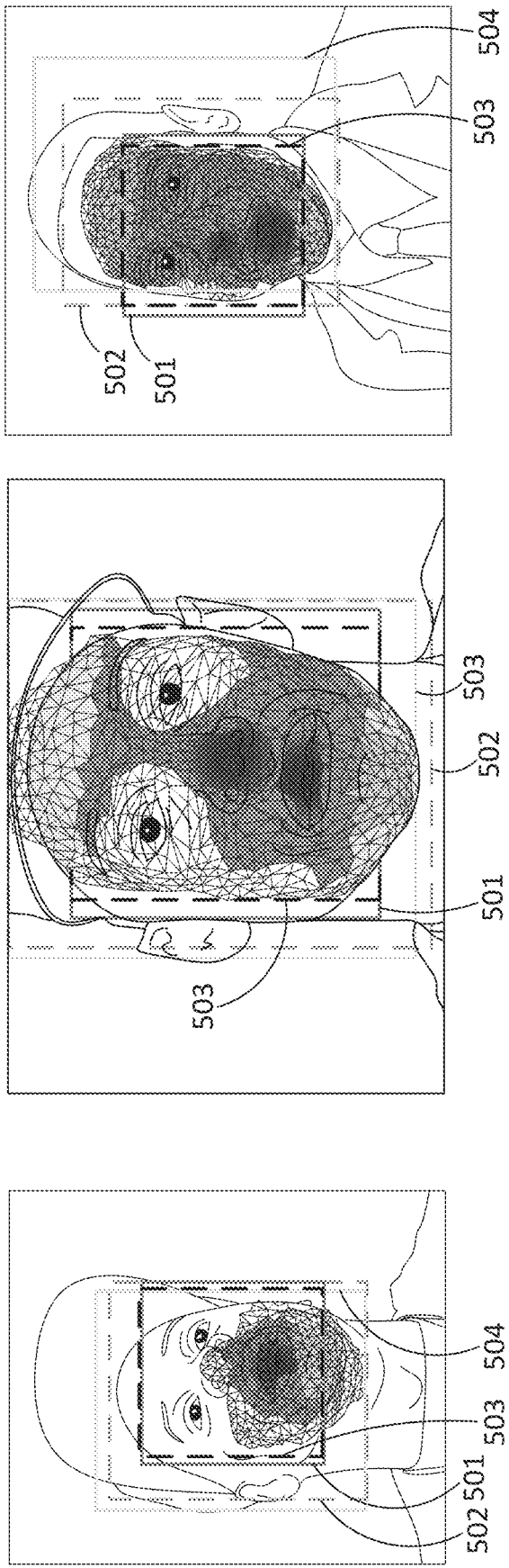

HEAD POSITION EXTRAPOLATION BASED ON A 3D MODEL AND IMAGE DATA

CROSS REFERENCE TO RELATED APPLICATION

This patent application claims the benefit of U.S. Provisional Patent Application Ser. No. 63/106,337 filed Oct. 27, 2020, entitled "HEAD POSITION EXTRAPOLATION BASED ON A 3D MODEL AND IMAGE DATA," which is hereby incorporated in its entirety by reference.

BACKGROUND

Face detection is a widely used application that has many use cases. For example, some systems can utilize processes for redacting faces for preserving anonymity and processes for locating a position of a face within an image. Some systems can produce an output that can provide a projection of how a person or object would look with a different choice of accessories (eyeglasses, earrings, etc.). In some existing systems, such projections can be generated by a process for extracting embeddings for a facial recognition service or presentation of person's face.

In another example, some use scenarios may cause a need for a system to determine some of the surroundings of the face such as the head or a large hat a person may be wearing, for better presentation or to improve any following analysis that is being done. This need for head localization processes creates many technical challenges.

In existing computing systems, solutions for head localization are complex in nature and require a considerable amount of computing resources. For example, a face localization usually relies on heuristics and other techniques that may require expanding the two-dimensional bounding box in a constant amount. Other popular approaches are machine learning-based, where systems are trained to learn the mapping from face to head. Training requires many iterations to obtain an acceptable level of accuracy. The existing techniques for head localization can be computationally inefficient and may not lead to an optimal result.

SUMMARY

The disclosed techniques provide a unique approach to using 3D algorithms to solve the 2D problem of head localization. The disclosed techniques enable a system to extrapolate aspects of one part of an object, e.g., extract characteristics of a head of a depicted person, from a 2D input image of another part of the object, e.g., a 2D image of a face of the depicted person. In one example, a face detector analyzes an input image of a person to generate data defining 2D bounding boxes of the person's face. The face detector can also provide data defining facial features and 3D rotation angles for each detected face. The system then selects an appropriate 3D model by the use of facial features. Using the selected 3D model and the 3D rotation angles provided by a face detector, the system rotates the model and then projects the model to a 2D shape. The system then scales and translates, e.g., transforms, the 2D shape to match the 2D face bounding box. Then, using the transformed 2D shape, the system extracts a bounding box for the extracted portion of an object, e.g., the head of the person depicted in the 2D input image.

The disclosed techniques provide computationally efficient techniques that do not require any heuristics. The face detector operations only require simple geometric transformations, which are extremely fast in inference and less complex than heuristics operations. In addition, the disclosed techniques are not based on machine learning, so a training phase is not required. As described in more detail below, the disclosed techniques provide an extractor, e.g., providing a 2D image of a head from a 2D image of a face, without requiring a system to retrain a face detector to extract bounding boxes for heads as well. This is done by utilizing an existing face detector that outputs 3D rotation angles in addition to the bounding boxes of the face. In addition, unlike other methods, the disclosed techniques provide a way for optimal model selections, which can provide an improved level of granularity. The disclosed techniques also provide a process utilizing geometric transformations until an optimal result is achieved. Most of the geometric operations (rotation+projection+scale+rotation) can be distilled to a single matrix that is applied to the mesh by multiplying the matrix with the mesh vertices coordinates. The single matrix can be used to generate a 2D image that depicts the extract characteristics. This enables systems to be more computationally efficient in an extraction or image extrapolation process.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 shows an example where a system selects a 3D model of a male head using facial features from an input image.

DETAILED DESCRIPTION

Figure 1:
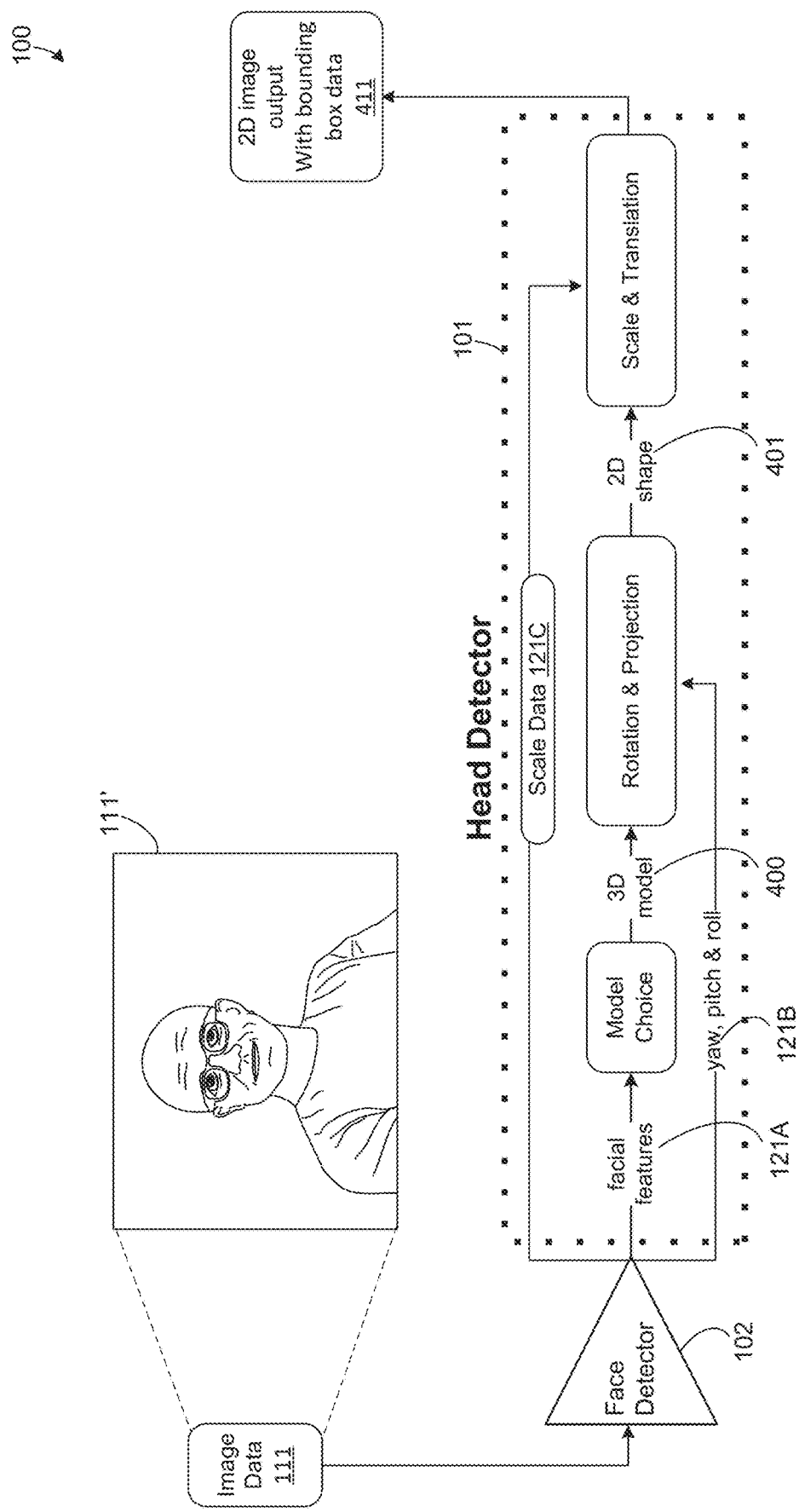
FIG. 1 illustrates a block diagram of a process flow for using 3D algorithms to solve the 2D problem of head localization.

With reference to FIG. 1, the techniques disclosed herein can follow the general process utilizing data generated by a face detector analyzing a 2D input image. In some configurations, a system 100 can include a number of computing components including a head detector 101 for executing the disclosed techniques. The head detector 101 can receive input data from a face detector 102 configured to analyze image data 111 of an input image 111'. The face detector 102 can generate data 121 identifying facial features 121A, 3D rotation attributes 121B (also referred to herein as rotation angles), and a 2D bounding box around the face of a depicted person. The facial features can be utilized to select a 3D model from one or more predetermined models. A system can apply rotation and projection operations on the 3D model using the 3D rotation attributes. Using the modified 3D model 400 resulting from the rotation and projection operations, the system can then generate a 2D shape. The system can then apply scaling and translation operations, using scale data 121C, to the 2D shape 401 utilizing the 2D face bounding box to generate a 2D image 411 relative to a 2D head bounding box that extrapolates features from the 2D input image 111'.

Figure 2:
FIG. 2 illustrates a 2D image with a first bounding box and a second bounding box.
Figure 3:
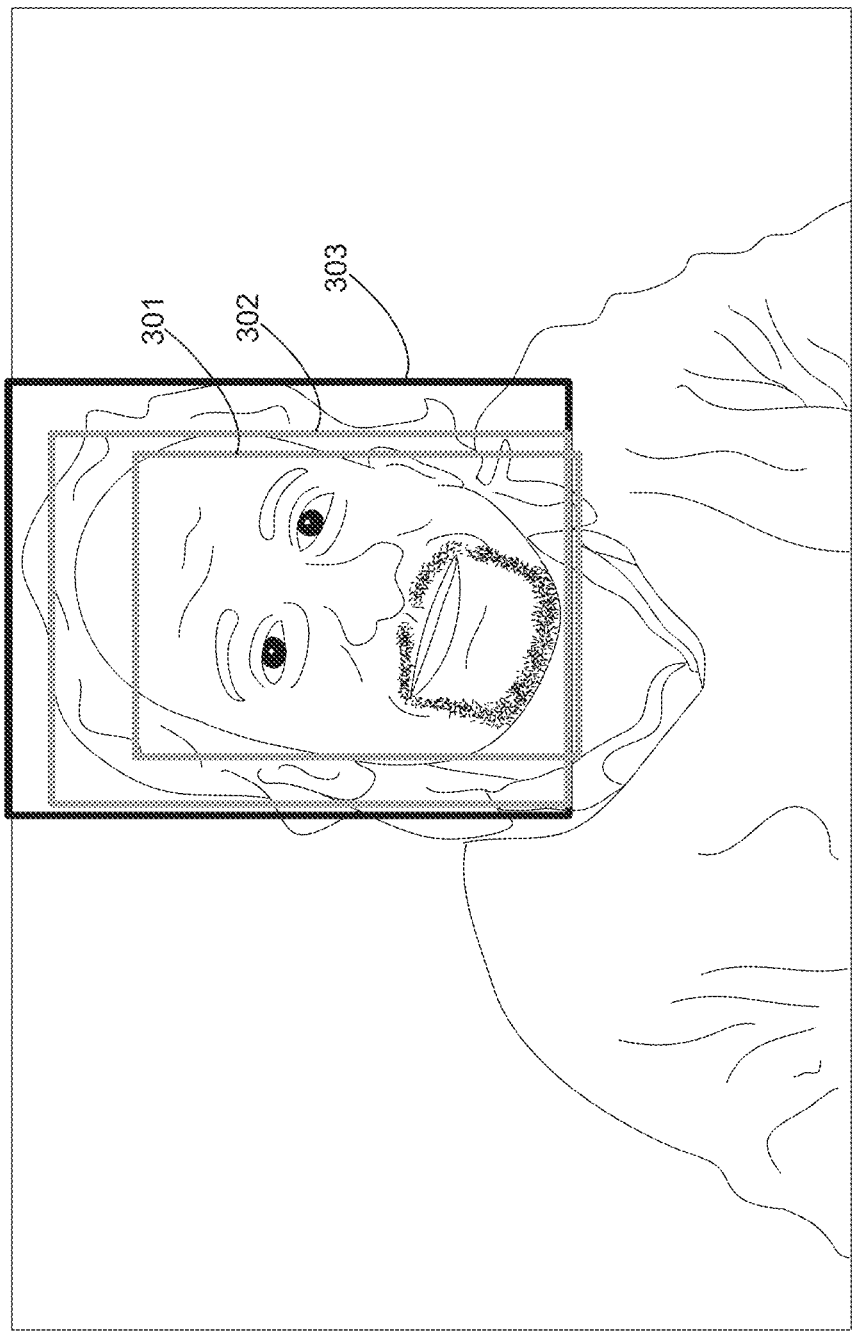
FIG. 3 illustrates a 2D image with bounding boxes showing the original face detected, an enlargement, and a predicted head region.

With reference to FIG. 2, the process can start with a 2D image 111' and data defining a first bounding box and a second bounding box. In this example, the first bounding box 201 (inner box), which is sized and positioned according to a component of a depicted object, e.g., the face of a depicted person. The second bounding box 202 (outer box), shows other components of the depicted object, e.g., the full head of the depicted person, which represents the boundary of the desired output in the form of a 2D image that is extrapolated from the input data. To extrapolate the head correctly, as shown in FIG. 3, a first inner bounding box 301 and a second inner bounding box 302 respectively show the original face detected and an enlargement. The outer bounding box 303 shows the predicted head that fits the tilted orientation of the depicted person.

Figure 4A:
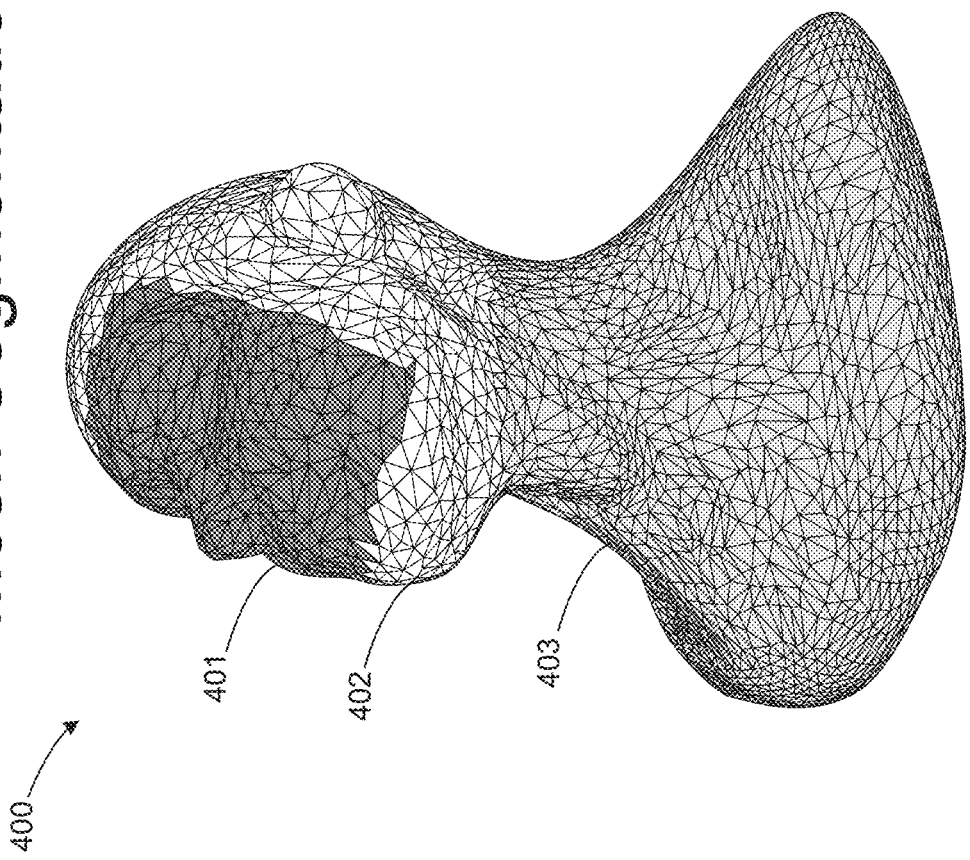
FIG. 4A illustrates an example of a 3D model that is in the form of a polygon mesh in a first orientation.

The prediction can be done via a 3D model that is a polygon mesh, such as the model shown in FIG. 4A. In some configurations, the 3D model can be associated with data defining an extraction of relevant information from the face segment. For instance, based on an analysis of an input image, e.g., a 2D image of a face, a system can determine 3D rotation angles, and other features like hair style, accessories, age, etc. A system can use these features to generate or choose from a library of existing 3D models to identify a selected model, the most appropriate model in the segment.

For example, one or more facial features detected from input image data can be utilized to determine one or more attributes. The attributes can be utilized to select one of the 3D models. For instance, if an attribute indicates that a depicted person in the input image data has wavy hair, a 3D model having characteristics of wavy hair can be selected. In another example, if an attribute indicates that a depicted person in the input image data is wearing a hat, a 3D model of a person wearing a hat can be selected. The 3D model can also have different segments, such as a face segment 401, a head segment 402, and other designated areas of the model, e.g., the non-head segment 403.

In some configurations, once the appropriate model is selected, the system can down sample the model. For instance, if a model with a given number of polygons, e.g., eighty-three thousand polygons, is greater than a threshold, a system can down sample the model to a lower number of polygons, e.g., ten thousand polygons. The details are still preserved while there is a significant computational benefit. The system can define a semantic segmentation of the model to different areas, e.g., face, head, and non-head. The system can do this with a rule-based approach, by mathematically dividing the 3D space and classifying surfaces, e.g., the triangles, accordingly.

Figure 4B:
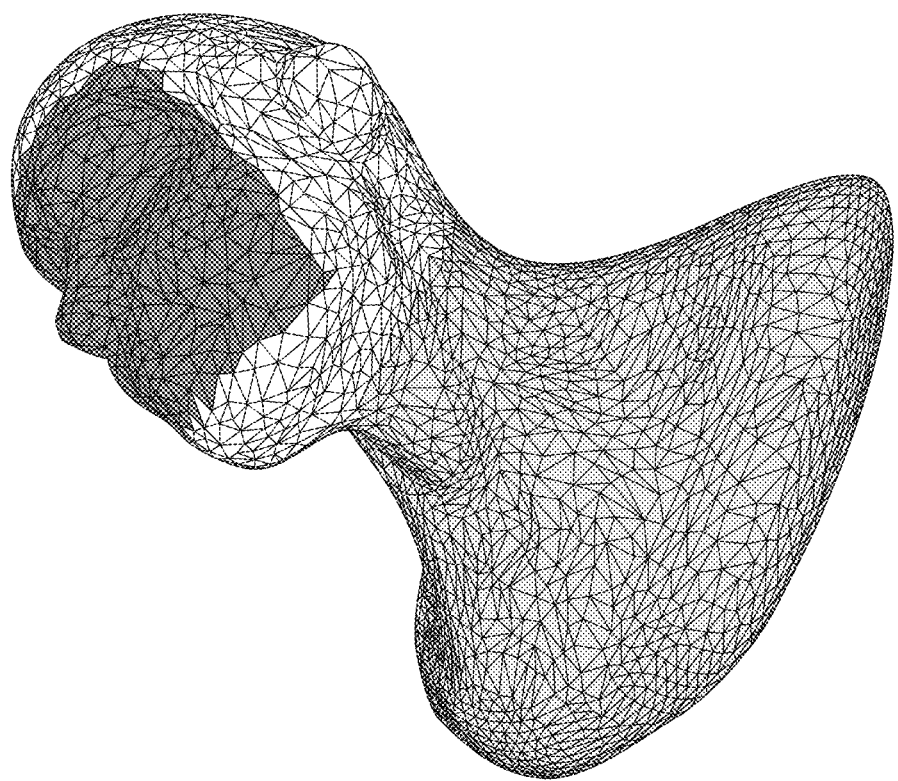
FIG. 4B illustrates an example of a 3D model that is in the form of a polygon mesh in a second orientation.

By the use of the 3D rotation angles, which can be derived from a face detector analyzing the 2D input image, a system can rotate the selected model. For example, as shown in FIG. 4B, if a person that is depicted in the input image is leaning back at a 35° angle, the system can rotate the model by the use of the determined rotation angles. In the example shown in FIG. 4B, the 3D model is rotated to show how the orientation of the 3D model can be modified according to the determined angles.

Some embodiments can a first operation for rotating the selected model in three dimensions. This operation can be done via a single matrix multiplication. Embodiments disclosed herein expand a 2D rotation matrix from basic linear algebra to be applied to 3D geometric bodies. In three dimensions there can be have three axes to rotate against, each can be described as a generalized 2D rotation matrix, and with matrix multiplication, the 3D rotation can be described as a three-on-three single matrix that incorporates all three rotations. This can be represented by the following equation:

$$R = R_z(\alpha)R_y(\beta)R_x(\gamma) = \begin{bmatrix} \cos\alpha & -\sin\alpha & 0 \\ \sin\alpha & \cos\alpha & 0 \\ 0 & 0 & 1 \end{bmatrix}^{yaw} \begin{bmatrix} \cos\beta & 0 & \sin\beta \\ 0 & 1 & 0 \\ -\sin\beta & 0 & \cos\beta \end{bmatrix}^{pitch} \begin{bmatrix} 1 & 0 & 0 \\ 0 & \cos\gamma & -\sin\gamma \\ 0 & \sin\gamma & \cos\gamma \end{bmatrix}^{roll}$$

$$R = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix}$$

Equation 1

As a result of the 3D rotation, a system can readily identify the location of each area of the 3D model. For example, a system can generate data, e.g., face, head, and non-head segments. The second operation projects the model from 3D to 2D. In some configurations, the system can use a simple, non-warping perspective by simply removing the depth axis. Our vertices and polygons are now two-dimensional.

The third operation provides a uniform scale. The model should match in size to the person in the image. Generally, the system compares an estimated face length to the model's face length, and determines how the model should be scaled. Uniform scale is a simple operation and both of the axes are scaled with the same factor. This can be achieved using a multiplication by a scalar.

In some configurations, the system matches estimated face coordinates to the model, e.g., extrapolate the head coordinates. In some configurations, a system can translate, the model and scale it uniformly in 2D until its facial area best matches an estimated facial area, e.g., the facial area best matches the model's facial area, and by that, extrapolate the head coordinates. In general, translation is a geometric transformation that moves every point of a figure or a space by the same distance in a given direction. A translation can also be interpreted as the addition of a constant or variable vector to every point, or as shifting the origin of the coordinate system. Next, utilizing the 2D data, the system can estimate a head area from the model. The system can also calculate a new location of the model's head and generate such data as an output.

FIG. 5 shows an example where a system selects a 3D model of a head using facial features from an input image. The first region 501 is what a convolutional neural network can predict as the face in the image. A system can use data defining the first region 501 to process the selected 3D model to generate data defining a second region 502 as a head prediction. More specifically, the second region 502 shows a projection to the 2D of the predicted location of the head of the 3D model. The 3D model can also be used to provide an output of a new face prediction if the matching between the 3D shape and the input does not meet one or more criteria. The third region 503 shows one example of an output of the new face prediction. For visualization and further processing, the system can overlay the head model over the image.

As shown on the left side of FIG. 5, a face detector can provide data indicating that the person's head is tilted. Thus, the model can be tilted to generate a more accurate image of the person's head from the 3D model. In this example, a selected model may be of a male wearing a hat. On the right side of FIG. 5, the person's head is tilted to the other side. This shows that the model captured the ear part better than the annotation, where the annotated area is shown by the fourth region 504. As shown, the disclosed techniques enable a face detector to perform localization outside of the image borders. By the use of a selected 3D model that is a pure mathematical entity, the system can still perform the disclosed techniques even with the introduction of negative pixels, as the algebra still holds.

Figure 6:
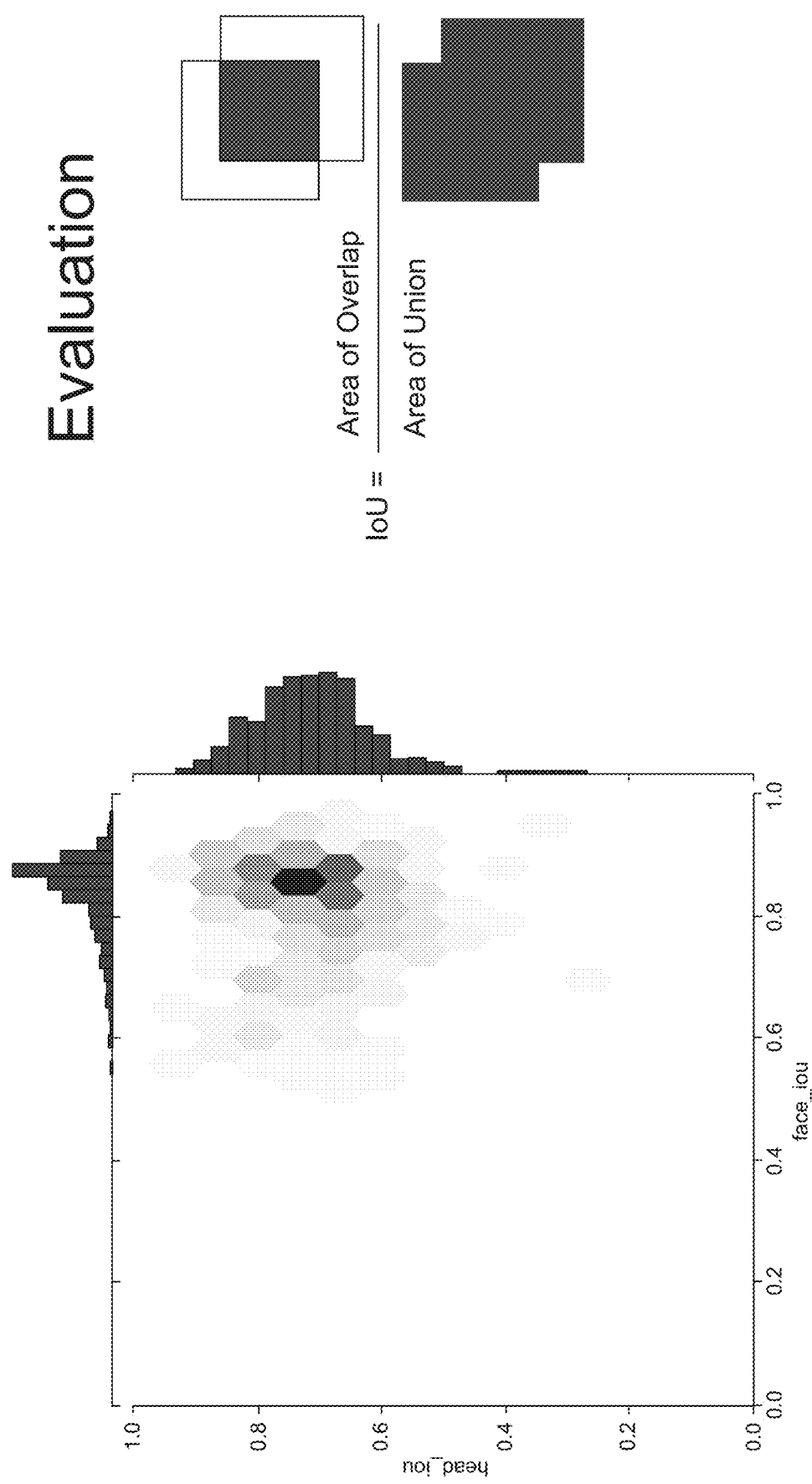
FIG. 6 shows aspects of a quantitative evaluation of a model's performance.

FIG. 6 shows aspects of a quantitative evaluation of a model's performance. In an example dataset, a dataset can have 33 K entries, where each entry contains a face bounding box, three 3D rotation angles, and a head bounding box. This dataset has licensing issues, which means we can't use it for training a model, but we can use it for evaluation of our method. We test our model by feeding it the face bounding boxes and the angles, and compare the result with the ground truth head bounding boxes. The IoU, intersection over union, is a metric that measures agreement between volumetric elements. It divides their overlapping area by the union of their areas. This figure shows the 2D distribution of face IoU and head IoU. In this example, the face IoU is very high, as expected, because the model receives the face estimation and modifies it only slightly. The head IoU is of interest, and this sample set shows that it is very high.

Figure 7:
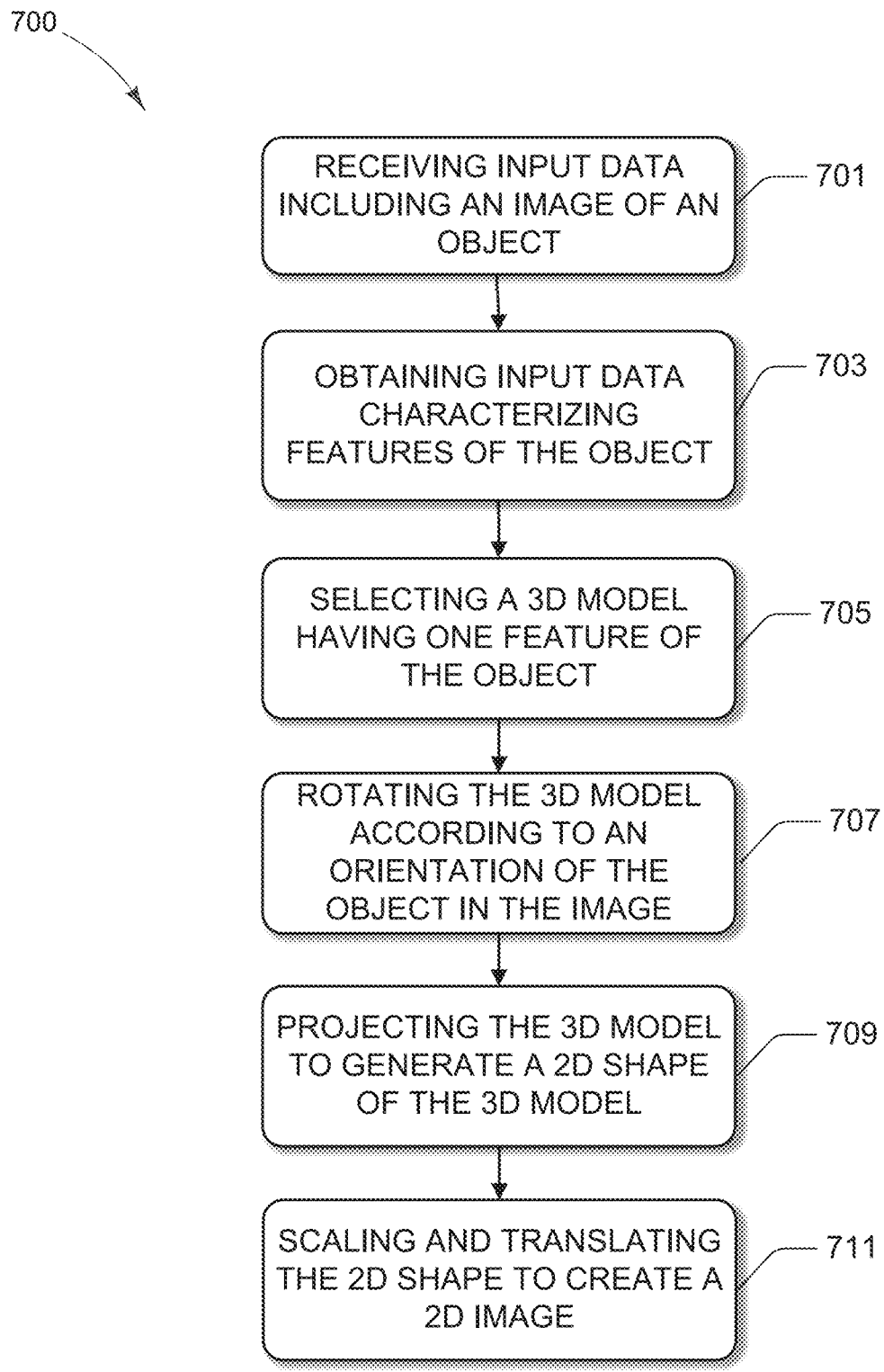
FIG. 7 illustrates a flow diagram of a routine for using 3D algorithms to solve the 2D problem of head localization.

Turning now to FIG. 7, aspects of a routine 700 for the disclosed techniques. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by an application, component and/or circuit. In some configurations, the application can be a dynamically linked library (DLL), a statically linked library, functionality produced by an application programing interface (API), a compiled program, an interpreted program, a script or any other executable set of instructions. Any data described herein, such as the image data or 3D model data, received an application can be stored in a data structure in one or more memory components. Data can be retrieved from the data structure by addressing links or references to the data structure.

Figure 8:
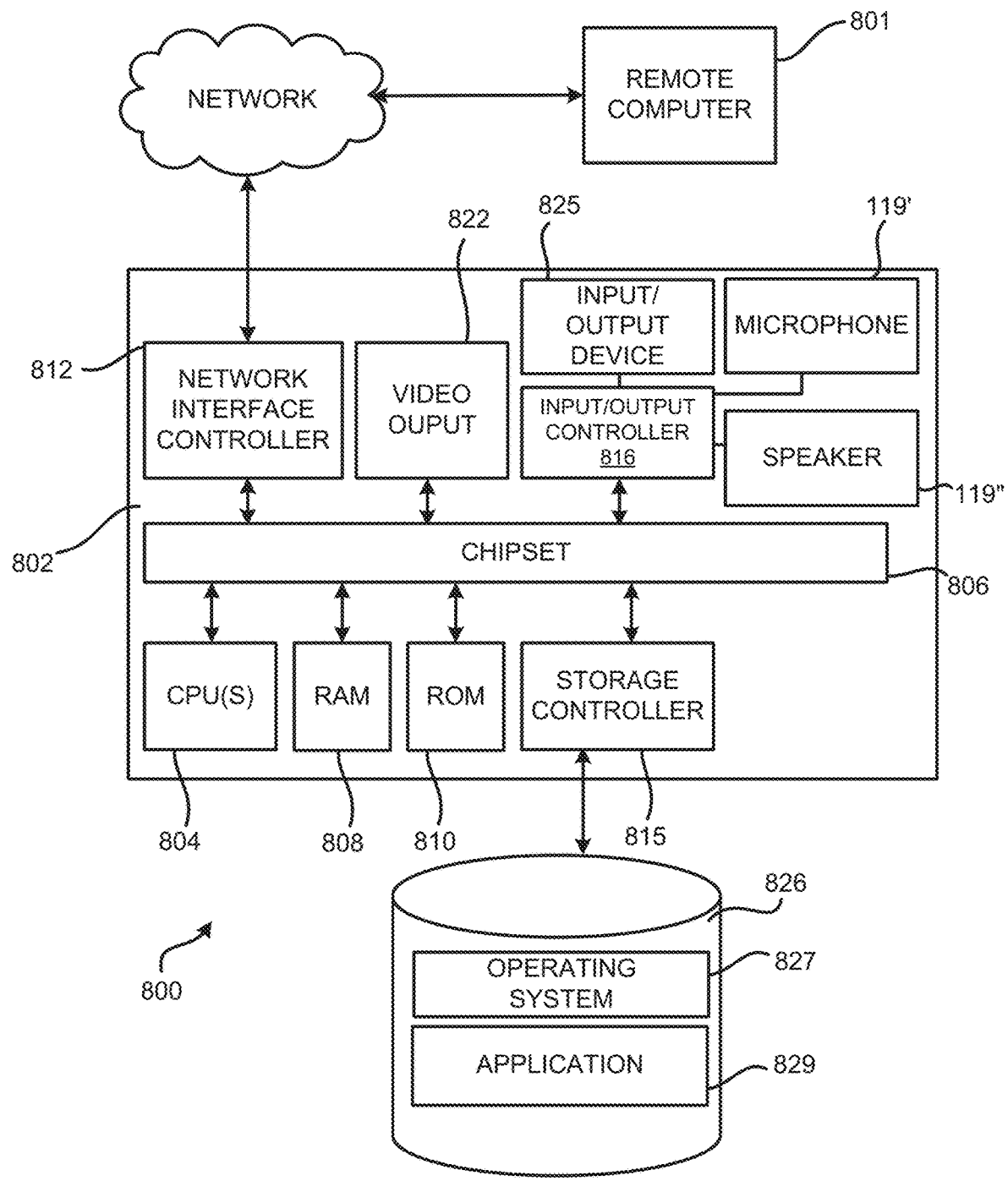
FIG. 8 is a computer architecture diagram illustrating an illustrative computer hardware and software architecture for a computing system capable of implementing aspects of the techniques and technologies presented herein.

Although the following illustration refers to the components of FIG. 1 and FIG. 8, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. Any service, circuit or application suitable for providing the techniques disclosed herein can be used in operations described herein.

With reference to FIG. 7, the routine 700 begins at operation 701, where a computing device receives an input image depicting an object. The object an include a person or a physical object such as a car or plane. If the image depicts a person, the image can include the face of the person.

Next, at operation 703, the computing device can obtain input data characterizing features of the object. In one example, a face detector, which can be a module within the computing device or a remote service configured to analyze images of people, can analyze the input image and generate bounding boxes around the face of a person. In addition, the face detector can indicate a particular orientation to generate orientation data indicating at least one of a yaw, a pitch, and a roll of the face of the person. The same can be done for an airplane or a car, orientation data can be generated based on the orientation of a depicted object. In addition, for an object, a bounding box can be defined for a particular feature of the object, such as a wing of an airplane or a door of a car.

Next, at operation 705, the computing device can select a 3D model based on features of the depicted object. In some configurations, the selection of the 3D model from a number of 3D models can be based on the 3D model having at least one feature associated with the person depicted in the input image. For instance, if the person depicted in the image is wearing a hat, the system may select a 3D model of a person wearing a hat. The system can also detect types of different accessories. For instance, the system can determine a type of hat and selected model based on the hat type, e.g., a baseball hat, a cowboy hat, etc. The same can be done for other objects. For instance, if a particular airplane type is depicted in the image, the system can select a 3D model of an airplane having a similar type, e.g., jet engine versus a propeller plane. In some configurations, the computing device can also select a default 3D model.

At operation 707, the computing device can execute a rotation operation to the 3D model using at least one orientation parameter obtained from the analysis of the image data. For instance, if the image includes a picture of a person looking straight into the camera, a particular pitch, roll, and yaw can be determined. Such detected parameters can be applied to the 3D model. In this example of the person looking straight into the camera, the 3D model can be oriented toward the reference point based on the detected parameters.

In operation 709, the computing device can cause the execution of a projection operation to the 3D model to generate a 2D shape of the 3D model. The 2D model comprises geometric shapes from a head segment of the 3D model, and the geometric shapes from a head segment of the 3D model are configured to be used to provide an extension of the at least one feature of the face of the person.

Next, at operation 711, the computing device can cause the execution of a scaling operation and a translation operation to the 2D shape utilizing the face bounding box to generate a 2D output image that includes a graphical extrapolation of physical features of a head of the person. The physical features of the head are based on the geometric shapes from the head segment of the 3D model, wherein the graphical extrapolation of physical features of the head is positioned outside of the face bounding box and within a head bounding box.

FIG. 8 shows additional details of a computing device 800 for executing the features shown herein. The computer architecture shown in FIG. 8 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 8 may be utilized to execute any of the software components described above. Although some of the components described herein are specific to the computing devices 120, it can be appreciated that such components, and other components may be part of any suitable remote computer.

The computing device 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computing device 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computing device 800. The chipset 806 may further provide an interface to a computer-readable storage medium such as a read-only memory ("ROM") 810 or non-volatile RAM ("NVRAM") for storing basic routines that help to startup the computing device 800 and to transfer information between the various components and devices. The ROM 810 or NVRAM may also store other software components necessary for the operation of the computing device 800 in accordance with the embodiments described herein.

The computing device 800 may operate in a networked environment using logical connections to remote computing devices and computer systems through a network, such as the local area network. The chipset 806 may include functionality for providing network connectivity through a network interface controller (NIC) 812, such as a gigabit Ethernet adapter. The NIC 812 is capable of connecting the computing device 800 to other computing devices over the network. It should be appreciated that multiple NICs 812 may be present in the computing device 800, connecting the computer to other types of networks and remote computer systems. The network allows the computing device 800 to communicate with remote services and servers, such as the remote computer 801. As can be appreciated, the remote computer 801 may host a number of services such as the XBOX LIVE gaming service provided by MICROSOFT CORPORATION of Redmond Wash. In addition, as described above, the remote computer 801 may mirror and reflect data stored on the computing device 800 and host services that may provide data or processing for the techniques described herein.

The computing device 800 may be connected to a mass storage device 826 that provides non-volatile storage for the computing device. The mass storage device 826 may store system programs, application programs, other program modules, and data, which have been described in greater detail herein. The mass storage device 826 may be connected to the computing device 800 through a storage controller 815 connected to the chipset 806. The mass storage device 826 may consist of one or more physical storage units. The storage controller 815 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 826, other storage media and the storage controller 815 may include MultiMediaCard (MMC) components, eMMC components, Secure Digital (SD) components, PCI Express components, or the like.

The computing device 800 may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computing device 800 may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 826 by detecting the physical states or characteristics of one or more particular locations within the physical storage units.

In addition to the mass storage device 826 described above, the computing device 800 may have access to other computer-readable media to store and retrieve information, such as program modules, data structures, or other data. Thus, although the data and other modules are depicted as data and software stored in the mass storage device 826, it should be appreciated that these components and/or other modules may be stored, at least in part, in other computer-readable storage media of the computing device 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computing device 800. The computer-readable media can include the RAM 808, the ROM 810, and/or the storage device 826.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, "computer storage media," "non-transitory computer readable storage media," "computer-readable storage medium," and variations thereof may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 800. For purposes of the claims, the phrase "non-transitory computer readable storage media," "computer storage medium," "computer-readable storage medium," and variations thereof, does not include waves or signals per se and/or communication media.

The mass storage device 826 may store an operating system 827 utilized to control the operation of the computing device 800. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 826 may store other system or application programs and data utilized by the computing devices 120, such as the game application 131, companion application 132, game data 204, control commands 205, and/or any of the other software components and data described above. The mass storage device 826 might also store other programs and data not specifically identified herein.

In one embodiment, the mass storage device 826 or other computer-readable storage media is encoded with computer-executable instructions which, when loaded into the computing device 800, transform the computer from a general-purpose computing system into a special-purpose computer capable of implementing the embodiments described herein. These computer-executable instructions transform the computing device 800 by specifying how the CPUs 804 transition between states, as described above. According to one embodiment, the computing device 800 has access to computer-readable storage media storing computer-executable instructions which, when executed by the computing device 800, perform the various routines described above with regard to FIG. 7 and the other figures. The computing device 800 might also include computer-readable storage media for performing any of the other computer-implemented operations described herein.

The computing device 800 may also include one or more input/output controllers 816 for receiving and processing input from a number of input devices, such as a keyboard, a mouse, a microphone, a headset, a touchpad, a touch screen, an electronic stylus, or any other type of input device. Also shown, the input/output controllers 816 is in communication with an input/output device 825. The input/output controller 816 may provide output to a display, such as a computer monitor, a flat-panel display, a digital projector, a printer, a plotter, or other type of output device. The input/output controller 816 may provide input communication with other devices such as a microphone 119', a speaker 119", game controllers and/or audio devices. In addition, or alternatively, a video output 822 may be in communication with the chipset 806 and operate independent of the input/output controllers 816. It will be appreciated that the computing device 800 may not include all of the components shown in FIG. 8, may include other components that are not explicitly shown in FIG. 8, or may utilize an architecture completely different than that shown in FIG. 8.

The following clauses are to supplement the present disclosure.

Example Clause 1. A method, comprising: receiving an input image depicting a person, wherein the input image includes a face of the person; obtaining input data from a face detector defining a face bounding box that provides boundaries of the face of the person, the input data further defining orientation data indicating at least one of a yaw, a pitch, and a roll of the face of the person; selecting a 3D model from a number of 3D models, the 3D model selection based on a selection of a default 3D model or the 3D model selection being based on the 3D model having at least one feature associated with the person depicted in the input image; causing a rotation operation to the 3D model using at least one of the yaw, the pitch, or the roll that is obtained from the input data; causing a projection operation to the 3D model to generate a 2D shape of the 3D model, wherein the 2D model comprises geometric shapes from a head segment of the 3D model, wherein the geometric shapes from a head segment of the 3D model are configured to be used to provide an extension of the at least one feature of the face of the person; and causing a scaling operation and a translation operation to the 2D shape utilizing the face bounding box to generate a 2D output image (411) that includes a graphical extrapolation of physical features of a head of the person, the physical features being based on the geometric shapes from the head segment of the 3D model, wherein the graphical extrapolation of physical features of the head is positioned outside of the face bounding box (201) and within a head bounding box (202).

Example Clause 2. The method of clause 1, wherein the at least one feature associated with the person indicates at least one of a hair style, a clothing item, or an accessory associated with the person depicted in the input image, wherein the selection of the 3D model is based on the 3D model having at least one of the hair style, the clothing item, or the accessory.

Example Clause 3. The method of clauses 1 and 2, wherein the projection operation to the 3D model to generate the 2D shape of the 3D model comprises removing a depth axis transform from the vertices and polygons of the 3D model to a two-dimensional format.

Example Clause 4. The method of clauses 1 through 3, wherein scaling comprises: receiving an estimated face length obtained by an analysis of the input image with a face length of a face segment of the 3D model, wherein the analysis is used to determine a scaling factor to match the size of the face length of the 3D model with the estimated face length; and adjusting the scale of the 3D model in two axes using the scaling factor, wherein the adjustment of the scale of the 3D model generates a set of coordinates for the physical features that model the head of the person.

Example Clause 5. The method of clauses 1 through 4, wherein the at least one physical feature includes an object worn by the person, wherein the 3D model selection is based on the 3D model having a virtual object that represents the object worn by the person, wherein the 2D shape includes a graphical extrapolation of the object relative to the head of the person.

Example Clause 6. The method of clauses 1 through 5, wherein the input data further defines at least one physical feature associated with the person.

7. A method, comprising: receiving an input image (111) depicting an object, wherein the input image includes a first portion of the object; obtaining input data (121) defining a first bounding box that provides graphical boundaries of the first portion of the object, the input data further defining orientation data indicating at least one of a yaw, a pitch, and a roll of the first portion of the object; selecting a 3D model (400) from a number of 3D models, the 3D model selection based on a default 3D model or the selection being based on the 3D model having at least one physical feature of the object depicted in the input image, wherein the 3D model has at least a first segment that is associated with the first portion of the object and a second segment that is associated with a second portion of the object; causing a rotation of the 3D model (400) using at least one of the yaw, the pitch, or the roll that is obtained from the input data; applying a projection to the 3D model (400) to generate a 2D shape (401) of the 3D model, wherein the 2D model comprises geometric shapes from a first segment of the 3D model; and causing at least one of a scaling operation and a translation operation to the 2D shape (401) utilizing the first bounding box to generate a 2D output image that includes a graphical extrapolation of physical features of the second portion of the object, wherein a position of the graphical extrapolation of physical features is positioned outside of the first bounding box (201) and within a second bounding box (202).

Example Clause 8. The method of clause 7, wherein the projection operation to the 3D model to generate the 2D shape of the 3D model comprises removing a depth axis transform from the vertices and polygons of the 3D model to a two-dimensional format.

Example Clause 9. The method of clauses 7 and 8, wherein scaling comprises:

receiving an estimated length of the first portion of the object obtained by an analysis of the input image with a first segment length of the 3D model, wherein the analysis is used to determine a scaling factor to match the size of the first segment length of the 3D model with the estimated length of the first portion of the object; and adjusting the scale of the 3D model in two axes using the scaling factor, wherein the adjustment of the scale of the 3D model generates a set of coordinates for the physical features that model the second portion of the object.

Example Clause 10. The method of clauses 7 through 9, wherein the input image further defines at least one physical feature associated with the object.

Example Clause 11. The method of clauses 7 through 10, wherein the at least one physical feature of the object depicted in the input image comprises a shape of a component of the object.

Example Clause 12. The method of clauses 7 through 11, wherein the at least one physical feature of the object depicted in the input image comprises a curvature of a surface of the object.

Example Clause 13. The method of clauses 7 through 12, wherein the at least one physical feature of the object depicted in the input image comprises a texture of a component of the object.

Example Clause 14. A computing device (800), the computing device (800) comprising: one or more processing units (804); and a computer-readable storage medium (808) having encoded thereon computer-executable instructions to cause the one or more processing units (804) to: receiving an input image (111) depicting a person, wherein the input image includes a face of the person; obtaining input data (121) from a face detector defining a face bounding box that provides boundaries of the face of the person, the input data (121) further defining orientation data indicating at least one of a yaw, a pitch, and a roll of the face of the person; selecting a 3D model (400) from a number of 3D models, the 3D model selection based on a selection of a default 3D model or the 3D model selection being based on the 3D model having at least one feature associated with the person depicted in the input image; causing a rotation operation to the 3D model (400) using at least one of the yaw, the pitch, or the roll that is obtained from the input data (121); causing a projection operation to the 3D model to generate a 2D shape (401) of the 3D model (400), wherein the 2D model comprises geometric shapes from a head segment of the 3D model, wherein the geometric shapes from a head segment of the 3D model are configured to be used to provide an extension of the at least one feature of the face of the person; and causing a scaling and a translation to the 2D shape (401) utilizing the face bounding box to generate a 2D output image (411) that includes a graphical extrapolation of physical features of a head of the person, the physical features being based on the geometric shapes from the head segment of the 3D model, wherein the graphical extrapolation of physical features of the head is positioned outside of the face bounding box (201) and within a head bounding box (202).

Example Clause 15. The computing device of clause 14, wherein the at least one feature associated with the person indicates at least one of a hair style, a clothing item, or an accessory associated with the person depicted in the input image, wherein the selection of the 3D model is based on the 3D model having at least one of the hair style, the clothing item, or the accessory.

Example Clause 16. The computing device of clauses 14 and 15, wherein the projection operation to the 3D model to generate the 2D shape of the 3D model comprises removing a depth axis transform from the vertices and polygons of the 3D model to a two-dimensional format.

Example Clause 17. The computing device of clauses 14 through 16, wherein scaling comprises: receiving an estimated face length obtained by an analysis of the input image with a face length of a face segment of the 3D model, wherein the analysis is used to determine a scaling factor to match the size of the face length of the 3D model with the estimated face length; and adjusting the scale of the 3D model in two axes using the scaling factor, wherein the adjustment of the scale of the 3D model generates a set of coordinates for the physical features that model the head of the person.

Example Clause 18. The computing device of clauses 14 through 17, wherein the at least one physical feature includes an object worn by the person, wherein the 3D model selection is based on the 3D model having a virtual object that represents the object worn by the person, wherein the 2D shape includes a graphical extrapolation of the object relative to the head of the person.

Example Clause 19. The computing device of clauses 14 through 18, wherein the input data further defines at least one physical feature associated with the person.

Example Clause 20. The computing device of clauses 14 through 19, wherein the at least one feature associated with the person indicates a shape of the face of the person.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method, comprising:
   receiving an input image depicting a person, wherein the input image includes a face of the person;
   obtaining input data from a face detector defining a face bounding box that provides boundaries of the face of the person, the input data further defining orientation data indicating at least one of a yaw, a pitch, and a roll of the face of the person;
   selecting a 3D model from a number of 3D models, the 3D model selection based on a selection of a default 3D model or the 3D model selection being based on the 3D model having at least one feature associated with the person depicted in the input image;
   causing a rotation operation to the 3D model using at least one of the yaw, the pitch, or the roll that is obtained from the input data;
   causing a projection operation to the 3D model to generate a 2D shape of the 3D model, wherein a 2D model comprises geometric shapes from a head segment of the 3D model, wherein the geometric shapes from a head segment of the 3D model are configured to be used to provide an extension of the at least one feature of the face of the person; and
   causing a scaling operation and a translation operation to the 2D shape utilizing the face bounding box to generate a 2D output image that includes a graphical extrapolation of physical features of a head of the person, the physical features being based on the geometric shapes from the head segment of the 3D model, wherein the graphical extrapolation of physical features of the head is positioned outside of the face bounding box and within a head bounding box.

2. The method of claim 1, wherein the at least one feature associated with the person indicates at least one of a hair style, a clothing item, or an accessory associated with the person depicted in the input image, wherein the selection of the 3D model is based on the 3D model having at least one of the hair style, the clothing item, or the accessory.

3. The method of claim 1, wherein the projection operation to the 3D model to generate the 2D shape of the 3D model comprises removing a depth axis transform from the vertices and polygons of the 3D model to a two-dimensional format.

4. The method of claim 1, wherein scaling comprises:
   receiving an estimated face length obtained by an analysis of the input image with a face length of a face segment of the 3D model, wherein the analysis is used to determine a scaling factor to match the size of the face length of the 3D model with the estimated face length; and
   adjusting the scale of the 3D model in two axes using the scaling factor, wherein the adjustment of the scale of the 3D model generates a set of coordinates for the physical features that model the head of the person.

5. The method of claim 1, wherein the at least one physical feature includes an object worn by the person, wherein the 3D model selection is based on the 3D model having a virtual object that represents the object worn by the person, wherein the 2D shape includes a graphical extrapolation of the object relative to the head of the person.

6. The method of claim 1, wherein the input data further defines at least one physical feature associated with the person.

7. A method, comprising:
   receiving an input image depicting an object, wherein the input image includes a first portion of the object;
   obtaining input data defining a first bounding box that provides graphical boundaries of the first portion of the object, the input data further defining orientation data indicating at least one of a yaw, a pitch, and a roll of the first portion of the object;
   selecting a 3D model from a number of 3D models, the 3D model selection based on a default 3D model or the selection being based on the 3D model having at least one physical feature of the object depicted in the input image, wherein the 3D model has at least a first segment that is associated with the first portion of the object and a second segment that is associated with a second portion of the object;
   causing a rotation of the 3D model using at least one of the yaw, the pitch, or the roll that is obtained from the input data;
   applying a projection to the 3D model to generate a 2D shape of the 3D model, wherein a 2D model comprises geometric shapes from a first segment of the 3D model; and
   causing at least one of a scaling operation and a translation operation to the 2D shape utilizing the first bounding box to generate a 2D output image that includes a graphical extrapolation of physical features of the second portion of the object, wherein a position of the graphical extrapolation of physical features is positioned outside of the first bounding box and within a second bounding box.

8. The method of claim 7, wherein the projection operation to the 3D model to generate the 2D shape of the 3D model comprises removing a depth axis transform from the vertices and polygons of the 3D model to a two-dimensional format.

9. The method of claim 7, wherein scaling comprises:
   receiving an estimated length of the first portion of the object obtained by an analysis of the input image with a first segment length of the 3D model, wherein the analysis is used to determine a scaling factor to match the size of the first segment length of the 3D model with the estimated length of the first portion of the object; and
   adjusting the scale of the 3D model in two axes using the scaling factor, wherein the adjustment of the scale of the 3D model generates a set of coordinates for the physical features that model the second portion of the object.

10. The method of claim 7, wherein the input image further defines at least one physical feature associated with the object.

11. The method of claim 7, wherein the at least one physical feature of the object depicted in the input image comprises a shape of a component of the object.

12. The method of claim 7, wherein the at least one physical feature of the object depicted in the input image comprises a curvature of a surface of the object.

13. The method of claim 7, wherein the at least one physical feature of the object depicted in the input image comprises a texture of a component of the object.

14. A computing device, the computing device comprising:
    one or more processing units; and
    a computer-readable storage medium having encoded thereon computer-executable instructions to cause the one or more processing units to:
    receiving an input image depicting a person, wherein the input image includes a face of the person;
    obtaining input data from a face detector defining a face bounding box that provides boundaries of the face of the person, the input data further defining orientation data indicating at least one of a yaw, a pitch, and a roll of the face of the person;
    selecting a 3D model from a number of 3D models, the 3D model selection based on a selection of a default 3D model or the 3D model selection being based on the 3D model having at least one feature associated with the person depicted in the input image;
    causing a rotation operation to the 3D model using at least one of the yaw, the pitch, or the roll that is obtained from the input data;
    causing a projection operation to the 3D model to generate a 2D shape of the 3D model, wherein a 2D model comprises geometric shapes from a head segment of the 3D model, wherein the geometric shapes from a head segment of the 3D model are configured to be used to provide an extension of the at least one feature of the face of the person; and
    causing a scaling and a translation to the 2D shape utilizing the face bounding box to generate a 2D output image that includes a graphical extrapolation of physical features of a head of the person, the physical features being based on the geometric shapes from the head segment of the 3D model, wherein the graphical extrapolation of physical features of the head is positioned outside of the face bounding box and within a head bounding box.

15. The computing device of claim 14, wherein the at least one feature associated with the person indicates at least one of a hair style, a clothing item, or an accessory associated with the person depicted in the input image, wherein the selection of the 3D model is based on the 3D model having at least one of the hair style, the clothing item, or the accessory.

16. The computing device of claim 14, wherein the projection operation to the 3D model to generate the 2D shape of the 3D model comprises removing a depth axis transform from the vertices and polygons of the 3D model to a two-dimensional format.

17. The computing device of claim 14, wherein scaling comprises:
    receiving an estimated face length obtained by an analysis of the input image with a face length of a face segment of the 3D model, wherein the analysis is used to determine a scaling factor to match the size of the face length of the 3D model with the estimated face length; and
    adjusting the scale of the 3D model in two axes using the scaling factor, wherein the adjustment of the scale of the 3D model generates a set of coordinates for the physical features that model the head of the person.

18. The computing device of claim 14, wherein the at least one physical feature includes an object worn by the person, wherein the 3D model selection is based on the 3D model having a virtual object that represents the object worn by the person, wherein the 2D shape includes a graphical extrapolation of the object relative to the head of the person.

19. The computing device of claim 14, wherein the input data further defines at least one physical feature associated with the person.

20. The computing device of claim 14, wherein the at least one feature associated with the person indicates a shape of the face of the person.

* * * * *